US008701177B2

(12) United States Patent
Anderson et al.

(10) Patent No.: US 8,701,177 B2
(45) Date of Patent: Apr. 15, 2014

(54) METHOD AND APPARATUS FOR GRAPHICAL PRESENTATION OF FIREWALL SECURITY POLICY

(75) Inventors: Brooke Madsen Anderson, Boulder, CO (US); Wiliam C. Bunn, Longmont, CO (US); Mary Karnes, Boulder, CO (US); Sarah M. Lieberman, Bridgewater, NJ (US); Mira E. Wilczek, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/430,186

(22) Filed: Mar. 26, 2012

(65) Prior Publication Data

US 2012/0216270 A1    Aug. 23, 2012

Related U.S. Application Data

(63) Continuation of application No. 10/922,500, filed on Aug. 19, 2004, now abandoned.

(51) Int. Cl.
*H04L 29/06* (2006.01)

(52) U.S. Cl.
USPC ............. 726/11; 715/711; 715/734; 715/736; 715/738; 709/224; 370/351; 370/352

(58) Field of Classification Search
None
See application file for complete search history.

(56) References Cited

U.S. PATENT DOCUMENTS

| | | | |
|---|---|---|---|
| 5,864,666 A | | 1/1999 | Shrader |
| 5,991,807 A | * | 11/1999 | Schmidt et al. ............... 709/225 |
| 5,999,179 A | * | 12/1999 | Kekic et al. ................... 715/734 |
| 6,044,402 A | * | 3/2000 | Jacobson et al. .............. 709/225 |
| 6,484,261 B1 | | 11/2002 | Wiegel |
| 6,816,897 B2 | * | 11/2004 | McGuire ....................... 709/223 |
| 7,076,393 B2 | * | 7/2006 | Ormazabal et al. ........... 702/122 |

(Continued)

FOREIGN PATENT DOCUMENTS

EP    1119151 A2    7/2001

OTHER PUBLICATIONS

Lacour, Sebastien; Perez, Christian; Priol, Thierry. A Network Topology Description Model for Grid Application Deployment. Fifth IEEE/ACM Workshop on Grid Computing. Pub. Date: 2004. Relevant pp. 61-68. Found on the World Wide Web at: http://ieeexplore.ieee.org/stamp/stamp.jsp?tp=&arnumber=1382816.*

(Continued)

*Primary Examiner* — Cordelia Zecher
*Assistant Examiner* — Jeremiah Avery
(74) *Attorney, Agent, or Firm* — Schmeiser, Olsen & Watts, LLP; Arthur Samodovitz

(57) ABSTRACT

A graphical representation of the firewall and a network coupled to the firewall is generated and displayed. A number of an inbound port of the network is displayed. An arrow adjacent to the port number pointing toward the network is displayed to indicate that a communication is permitted to the port. The port number and the arrow are located between an icon for the network and an icon for the firewall. A port number of a destination of a communication originating from the network is displayed. Also, another arrow adjacent to the destination port number pointing toward the firewall is displayed to indicate that a communication is permitted to the destination port number. The destination port number and the other arrow are located between an icon for the network and an icon for the firewall.

12 Claims, 17 Drawing Sheets

(56) References Cited

U.S. PATENT DOCUMENTS

| | | |
|---|---|---|
| 7,093,005 B2 * | 8/2006 | Patterson .................... 709/220 |
| 7,257,630 B2 * | 8/2007 | Cole et al. .................... 709/224 |
| 7,421,734 B2 * | 9/2008 | Ormazabal et al. ............. 726/11 |
| 7,567,523 B2 * | 7/2009 | Black et al. .................. 370/255 |
| 7,774,839 B2 * | 8/2010 | Nazzal ........................ 726/22 |
| 2002/0032784 A1 | 3/2002 | Durago et al. |
| 2002/0052941 A1 | 5/2002 | Patterson |
| 2003/0084098 A1 | 5/2003 | Lavin et al. |
| 2003/0217039 A1 | 11/2003 | Kurtz et al. |
| 2004/0010718 A1 * | 1/2004 | Porras et al. .................. 713/201 |
| 2004/0143658 A1 * | 7/2004 | Newton et al. ................ 709/224 |
| 2004/0162992 A1 * | 8/2004 | Sami et al. .................... 713/200 |
| 2004/0221191 A1 | 11/2004 | Porras et al. |
| 2006/0041936 A1 | 2/2006 | Anderson et al. |

OTHER PUBLICATIONS

"Business Method of Using Host Based Health Checking & Vulnerability Mitigation" Research Disclosure, Jan. 2002, pp. 114-115.

"Cisco PIX Device Manager Version 2.0", pp. 1-5.

* cited by examiner

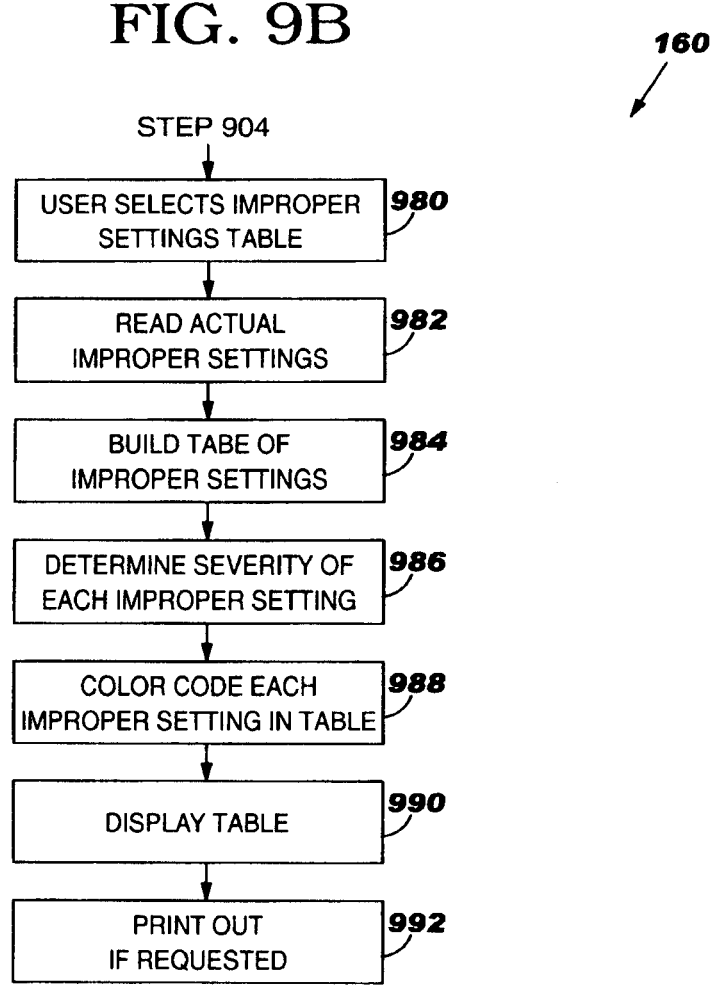

FIG. 11

| Security Rating | Rule Number | Source IP Address(es) | Destination IP Address(es) | Protocol | Port | Rule Action |
|---|---|---|---|---|---|---|
| | Rule 1 | 192.168.10.128/27 | 192.168.10.1 | TCP | 22 | Permit |
| | Rule 2 | 192.168.10.1 | 192.168.10.3 | UCP | 161 | Permit |
| | Rule 3 | 192.168.10.16 | 192.168.10.1 | TCP | 49 | Permit |
| Low | Rule 4 | Any | 63.24.1.0/24 | TCP | 80 | Permit |
| High | Rule 5 | 63.24.1.0/24 | Any | TCP | 21 | Permit |
| | Rule 6 | 63.24.2.0/24 | 63.24.1.32/28 | TCP | 9898 | Permit |
| | Rule 7 | 63.24.1.53 | 63.24.1.24 | TCP | 9494 | Permit |
| | Rule 8 | 63.24.2.0/24 | 63.24.1.0/24 | TCP | 5631 | Permit |
| Medium | Rule 9 | 63.24.1.0/24 | 192.168.10.0/24 | TCP | 80 | Permit |
| | Rule 10 | 192.168.10.0/24 | 63.24.1.0/24 | TCP | 443 | Permit |
| | Rule 11 | 192.168.10.0/24 | 63.24.1.0/24 | TCP | 22 | Permit |
| Medium | Rule 12 | 63.24.1.1 | 192.168.10.25 | UDP | 123 | Permit |
| | Rule 13 | 192.168.10.128/25 | 63.24.1.32/28 | TCP | 443 | Permit |
| | Rule 14 | Vulnerability | Recommendation | TCP | 5631 | Deny |
| | Rule 15 | | | Any | Any | Deny |

1041

TCP 21 - FTP protocol authentication method flows in the clear which gives the ability to sniff traffic to obtain authentication information.

Use secure FTP or SCP for file transfer. Userids and Passwords are encrypted. When implementing SCP, be sure to use latest protocol version, 2.0, and latest SSH software to minimize vulnerabilities of previous versions. Possible Resource: http://www.openssh.com/

Click on hyperlink Rule Number to see Vulnerability explanation and recommendation

FIG. 12

| Security Rating | Rule Number | Source IP Address(es) | Destination IP Address(es) | Protocol | Port | Rule Action |
|---|---|---|---|---|---|---|
| | Rule 1 | 192.168.10.128/27 | 192.168.10.1 | TCP | 22 | Permit |
| | Rule 2 | 192.168.10.1 | 192.168.10.3 | UCP | 161 | Permit |
| Medium | Rule 3 | 192.168.10.16 | 192.168.10.1 | TCP | 49 | Permit |
| | Rule 4 | Any | 63.24.1.0/24 | TCP | 80 | Permit |
| | Rule 5 | 63.24.1.0/24 | Any | TCP | 21 | Permit |
| | Rule 6 | 63.24.2.0/24 | 63.24.1.32/28 | TCP | 9898 | Permit |
| Low | Rule 7 | 63.24.1.53 | 63.24.1.24 | TCP | 9494 | Permit |
| Low | Rule 8 | 63.24.2.0/24 | 63.24.1.0/24 | TCP | 5631 | Permit |
| | Rule 9 | 63.24.1.0/24 | 192.168.10.0/24 | TCP | 80 | Permit |
| Low | Rule 10 | 192.168.10.0/24 | 63.24.1.0/24 | TCP | 443 | Permit |
| | Rule 11 | 192.168.10.0/24 | 63.24.1.0/24 | TCP | 22 | Permit |
| | Rule 12 | 63.24.1.1 | 192.168.10.25 | UDP | 123 | Permit |
| Low | Rule 13 | 192.168.10.128/25 | 63.24.1.32/28 | TCP | 443 | Permit |
| Low | Rule 14 | | 63.24.1.128/30 | TCP | 5631 | Deny |
| | Rule 15 | | | Any | Any | Deny |

Misconfiguration

1051 — This rule contradicts a rule later in the ruleset, rule 14. Rule 14 denies access to servers on TCP port 5631 after the flow was allowed in rule 8. Since this rule is further down the ruleset, the flow will be accepted on the first rule it matches, rule 8. This flow will never be denied to the specified servers, because it will never hit on a match. Rule 14 needs to be moved above this rule. See rule 14.

Click on hyperlink Rule Number to see Misconfiguration explanation

FIG. 14

| Security Rating | Rule Number | Source IP Address(es) | Destination IP Address(es) | Port/Protocol | Vulnerability | Recommendation |
|---|---|---|---|---|---|---|
| Low | Rule 4 | Any | 63.24.1.0/24 | TCP 80/HTTP | Leaving the firewall rule open to any source IP address increases the potential of hackers ability to initiate an attack over http, such as denial of service. If http methods on server are not disabled (ie. Get, Put,...) webserver is open to potential defacement. | Try to limit source IP addresses as much as possible. |
| High | Rule 5 | Any | 63.24.1.0/24 | TCP 21/FTP | TCP 21 - FTP protocol authentication method flows in the clear which gives the ability to sniff traffic to obtain authentication information. | Use secure FTP or SCP for file transfer. Userids and Passwords are encrypted. When implementing SCP, be sure to use latest protocol version. 2.0, and latest SSH software to minimize vulnerabilities of previous versions. Possible Resource: http://www.openssh.com/ |
| Medium | Rule 9 | 63.24.1.0/24 | 192.168.10.0/24 | TCP 80/HTTP | Allowing an unauthenticated flow from the DMZ to an internal network is not recommended. Flows from a lower security zone to a higher security zone should not be trusted. | Implement a protocol that provides strong authentication. In this case, HTTPS (SSL), TCP443, is an appropriate web browser protocol solution. Possible resource: http://www.openssl.org |
| Medium | Rule 12 | 63.24.1.1 | 192.168.10.25 | UDP 123/NTP | Allowing an unauthenticated flow from the DMZ to an internal network is not recommended. Flows from a lower security zone to a higher security zone should not be trusted | Implement xntp to provide the necessary authentication. Possible resource: http://www.ccd.bnl.gov/xntp/ |

FIG. 15

| Security Rating | Rule Number(s) | Source IP Address(es) | Destination IP Address(es) | Protocol | Port | Rule Action | Misconfiguration |
|---|---|---|---|---|---|---|---|
| Medium | Rule 3 | 192.168.10.16 | 192.168.10.1 | TCP | 49 | Permit | The current rule is allowing the Tacacs server to access the firewall on TCP port 49. This flow is written incorrectly. The Firewall is supposed to access the Tacacs server on port 49. Also, the only ports that should be open to the firewall are management ports (ie. Telnet, SSH). Rule needs to be rewritten. |
| Low | Rule 7 | 63.24.1.53 | 63.24.1.24 | TCP | 9494 | Permit | Since the source and destination hosts are on the same subnet, this flow will never pass through the firewall. Rule is not necessary. Keepng unnecessary flows degrades the performance of the firewall. Rule should be removed. |
| Low | Rule 8 | 192.168.10.0/24 | 63.24.1.0/24 | TCP | 5631 | Permit | This rule contradicts a rule later in the ruleset, rule 14. Rule 14 denies access to servers on TCP port 5631 after the flow was allowed in rule 8. Since this rule is further down the ruleset, the flow will be accepted on the first rule it matches, rule 8. This flow will never be denied to the specified server, because it will never hit on a match. Rule 14 needs to be moved above this rule. See rule 14. |
| Low | Rule 10 | 192.168.10.9/24 | 63.24.1.0/24 | TCP | 443 | Permit | This rule is identical to rule 13 except for the destination addresses are less specific then in rule 13. This rule encompasses the whole yellow zone subnet range. Rule 13 only encompasses a couple of servers and since this rule is further down the ruleset, the flow will be accepted on the first rule it matches, rule 10. Rule 13 will never hit on a match. Was the flow meant to encompass the whole yellow subnet or more specific to a set of servers? See rule 13. |
| Low | Rule 13 | 192.168.19.128/25 | 63.24.1.32/28 | TCP | 443 | Permit | For rule recommendations, see rule 13. |
| Low | Rule 14 | 63.24.2.0/24 | 63.24.1.128/30 | TCP | 5631 | Deny | For rule recommendations, see rule 8. |

FIG. 16

| Security Rating | Firewall Setting | Configuration Finding | Best Practices Recommendation |
|---|---|---|---|
| High | Logging buffered notification | Firewall logging is only set to buffered events. | Firewall logging needs to be set to lof to a syslog server. Logs are critical for accountability and in performing forensics investigations. |
| Medium | SNMP community "SNMPkey" | SNMP community string key is set to dictionary words and does not contain the recommended string length. | If the community string key was obtained, this would give an attached SNMP access to the firewall. |
| Medium | Telnet 192.168.10.0/8 | Firewall is accessible by Telnet. | The firewall has the ability to use SSH to access the firewall. Recommend that Telnet be disabled and SSH be used. SSH is a more secure protocol, because the userid and password are not transmitted in the clear. A even more secure implementation would to set up a authentication server to grant access to the firewall. Also, recommend that the subnet be limited to those who would be administering the device, instead of the whole private network. |
| Low | Outside interface security level 100 Inside interface security level 0 | The firewall considers the outside interface to be more secure than the inside interface. | Reapply appropriate security level to appropriate interface. |

METHOD AND APPARATUS FOR GRAPHICAL PRESENTATION OF FIREWALL SECURITY POLICY

CROSS REFERENCE TO RELATED APPLICATION

This application is a continuation of co-pending U.S. Ser. No. 10/922,500, filed Aug. 19, 2004 which published Feb. 23, 2006, as U.S. Patent Publication No. 20060041936 A1, now abandoned.

BACKGROUND OF THE INVENTION

The invention relates generally to computer networks, and deals more particularly with a technique to graphically present data flows, vulnerabilities and misconfigurations in a firewall.

To provide security, there are separate networks with security controls between each network. This enables an enterprise network to house confidential data separately from publicly available data, to separate financial networks from service networks, etc. All of these design considerations provide confidentiality, integrity and availability. Because external entities are not under complete control of the enterprise and are open to unknown users who may not be trusted, these networks are not considered trusted. Typically, an enterprise intranet is considered known and trusted because it houses internal communications within the enterprise. While this intranet communicates with an external network environment either to transmit or receive data communications, the intranet generally will not need to receive inbound communications directly from an untrusted networks. An extranet comprises known but untrusted network environments, such as "Demilitarized Zones ("DMZ")," "Service networks" and "Business to Business (B2B) interconnections." These networks are semi-secure because the owners and users are generally known but not trusted. There are also external unknown and untrusted networks such as the Open Internet. These are the riskiest types of networks with which to communicate.

The security controls between networks is often provided by a firewall. A firewall is a network device that can protect a variety of networks by inspecting, filtering and blocking data which flows to and through the network. The firewall can be installed between known and trusted networks, known and untrusted networks, and unknown and untrusted networks. A firewall is comprised of a routing engine and filters to screen out unwanted data communications. The firewall is responsible for enforcing a security policy for incoming and outgoing communications. The security policy may define the types of networks the known network is permitted to communicate and what protocols are permitted for the communications. For example, the firewall may only permit communications between the intranet and the enterprise's "DMZ", which is located between a trusted internal and untrusted and unknown external network. An enterprise's DMZ is comprised of servers and other related devices that are supplied and managed by the enterprise, but generally do not contain unencrytped sensitive data. Therefore, if the servers in the enterprise's DMZ are corrupted by a communication from another, untrusted network, the damage is limited. Because the management of these DMZ servers is performed by the enterprise itself, a measure of security exists in the enterprise DMZ which does not exist in the Open Internet. There are cases when a network does not have a firewall in which case it connects directly to other networks through a router.

Not only can a firewall deny traffic to and from networks, it can more granularly limit traffic between networks by limiting which hosts have access to communicate to or from network entities. These hosts are considered sophisticated enough to avoid receipt of damaging messages. These hosts are listed in a firewall ruleset. The firewall checks the ruleset for host identifiers (ex. IP Address or hostname) before permitting the communications. Audits of these rulesets are necessary to understand which hosts have outbound connectivity and determine if any of the rules violate a pre-specified corporate security mandate.

A third way a firewall can limit traffic between networks is by communication protocols and ports. The most common communication protocols are TCP, UDP and ICMP. Each of these protocols includes usage criteria such as the range of ports used by TCP and UDP for certain types of requests. The TCP and UDP ports indicate which applications in the recipient device should provide the requested services. It is desirable in some cases to limit the range of ports for certain types of communications. The limitation on the range of ports facilitates the handling of the requested service. For example, many programs are written to open any available TCP or UDP port. This makes the identification of the application using such a port difficult. In some such cases it is possible to restrict the range of ports available to these applications to assist in identifying which application is using the port. It may be preferable for some networks to not allow communication using an application requiring an unlimited range of TCP or UDP ports.

The protocols also may specify the types of ICMP which are permitted. Example types are Echo Request (which sends a ping), Echo Reply (which responds to a ping) and Host Unreachable. Some networks may not wish to accept certain types of ICMP messages. For example, some destination networks deny Echo Request messages from untrusted networks because they are potential denial of service attacks.

Some protocols are more controllable than others. For example, TCP provides "handshaking" for every communication whereas UDP does not. So, TCP is more controllable and trustworthy than UDP. Therefore, some networks may not want to accept UDP communications. It was known for an administrator to check whether the firewall permits incoming UDP communications, and if so, report a security violation. These checks were performed by reviewing the firewall access control lists or by sniffing traffic.

The security policy of a firewall also may prohibit certain message flows, such as those involving certain versions of Telnet and the Berkely R commands (rshell, rlogin) because these protocols have known security holes. It was known for a systems administrator to check if the firewall permits such message flows, and if so, report a security violation. These checks were performed by reviewing the firewall access control lists or by sniffing traffic.

The vast configurability of firewall rules equates to very complex rulesets with significant potential for mistakes. Filter rules should be verified regularly to ensure they conform to the enterprise security policy, are configured properly and function as intended. Traditionally, this is completed manually by a systems administrator or a person outside of the day-to-day operations of the firewall such as a security administrator. The systems administrator or security administrator reviews each firewall rule to confirm the network type of each IP address and ensure that the data flows configured in the firewall are acceptable according to the enterprise security policy. While this technique is effective, it requires tedious, human review of the configuration information from each network with which communication is desired, and there can be many such networks. Routers and firewalls of networks are often changed, and this may require the systems administrator or security administrator to repeat the foregoing investigation.

A Solsoft computer program (by Solsoft Inc.) was known to display a diagram of networks connected to each other, and firewalls within the networks. This program includes an option to color code each of the networks. This option was commercially used (more than one year ago) to color code each network based on the security level of the network. This known color coding was blue for a most secure intranet, green for protected DMZ or Service network, yellow for a DMZ or Service network and red for an insecure network such as the Open Internet.

EP 1119151A2 to Alain et al. disclose a computer program which displays a graphical representation of a network; the data flows of the network can be determined through a series of queries.

An object of the present invention is to improve the process of reporting data flows, data flow vulnerabilities, data flow misconfigurations and improper firewall settings.

SUMMARY OF THE INVENTION

The invention resides in a system, method and computer program product for reporting a data flow in a firewall. A graphical representation of the firewall and a network coupled to the firewall is generated and displayed. A number of an inbound port of the network is displayed. An arrow adjacent to the port number pointing toward the network is displayed to indicate that a communication is permitted to the port.

According to a feature of the present invention, the port number and the arrow are located between an icon for the network and an icon for the firewall.

According to another feature of the present invention, a port number of a destination of a communication originating from the network is displayed. Also, another arrow adjacent to the destination port number pointing toward the firewall is displayed to indicate that a communication is permitted to the destination port number. The destination port number and the other arrow are located between an icon for the network and an icon for the firewall.

The invention also resides in a system, method and program product for reporting data flow vulnerabilities in a firewall. A table including definitions of a plurality of rules is generated and displayed. Each of the definitions includes an entry for a source IP address of a permitted but vulnerable data flow, an entry for a destination IP address of the permitted but vulnerable data flow, and an entry for a protocol or destination port of the permitted but vulnerable data flow. The source IP address entry in the table is color coded to indicate a security level of a source network containing the source IP address. The destination IP address entry in the displayed table is color coded to indicate a security level of a destination network containing the destination IP address.

According to a feature of the present invention, the definition for each of the rules includes both the entry for the protocol and the entry for the destination port. The entry for the protocol and/or the entry for the destination port is color coded to indicate a severity of the vulnerability.

According to another feature of the present invention, the table also includes other definitions of another plurality of rules. Each of the other definitions including an entry for a source IP address of a vulnerable, denied data flow, an entry for a destination address of the vulnerable, denied data flow, and an entry for a protocol or destination port of the vulnerable, denied data flow. The source IP address entry in the table is color coded to indicate a security level of a source network containing the source IP address of the vulnerable, denied data flow. The destination IP address entry in the table is color coded to indicate a security level of a destination network containing the destination IP address of the vulnerable, denied data flow.

The invention also resides in a system, method and computer program product for reporting data flow misconfigurations in a firewall. A table including definitions of a plurality of rules is generated and displayed. Each of the definitions includes an entry for a source IP address of a permitted but misconfigured data flow, an entry for a destination IP address of the permitted but misconfigured data flow, and an entry for a protocol or destination port of the permitted but misconfigured data flow. The source IP address entry in the table is color coded to indicate a security level of a source network containing the source IP address. The destination IP address entry in the table is color coded to indicate a security level of a destination network containing the destination IP address.

According to a feature of the present invention, the definition for each of the rules includes both the entry for the protocol and the entry for said destination port. The entry for the protocol or the entry for the port is color coded to indicate a severity of the misconfiguration.

The invention also resides in a system, method and computer program product for reporting improper settings in a firewall. A table including descriptions and security-risk severity ratings of a respective plurality of settings of the firewall is generated and displayed. Some or all of the settings are improper. The security-risk ratings or descriptions of the improper settings are color coded to indicate respective security-risk severities of the improper settings.

BRIEF DESCRIPTION OF THE FIGURES

FIGS. 9(A) and 9(B) form a flow chart illustrating the steps of a program function within the security checking program of FIG. 1 to display a network diagram, vulnerabilities and misconfigurations in the data flows through the firewall, and improper settings on the firewall itself.

FIG. 11 is an example of a vulnerability table generated and displayed by the program function of FIGS. 9(A) and 9(B).

FIG. 12 is an example of a misconfiguration table generated and displayed by the program function of FIGS. 9(A) and 9(B).

FIG. 14 is an example of a printout of vulnerability findings for firewall 21, by the program function of FIGS. 9(A) and 9(B).

FIG. 15 is an example of a printout of misconfiguration findings for firewall 21, by the program function of FIGS. 9(A) and 9(B).

FIG. 16 is an example of a printout of improper settings of firewall 21, by the program function of FIGS. 9(A) and 9B).

DETAILED DESCRIPTION OF THE PREFERRED EMBODIMENTS

Figure 1:
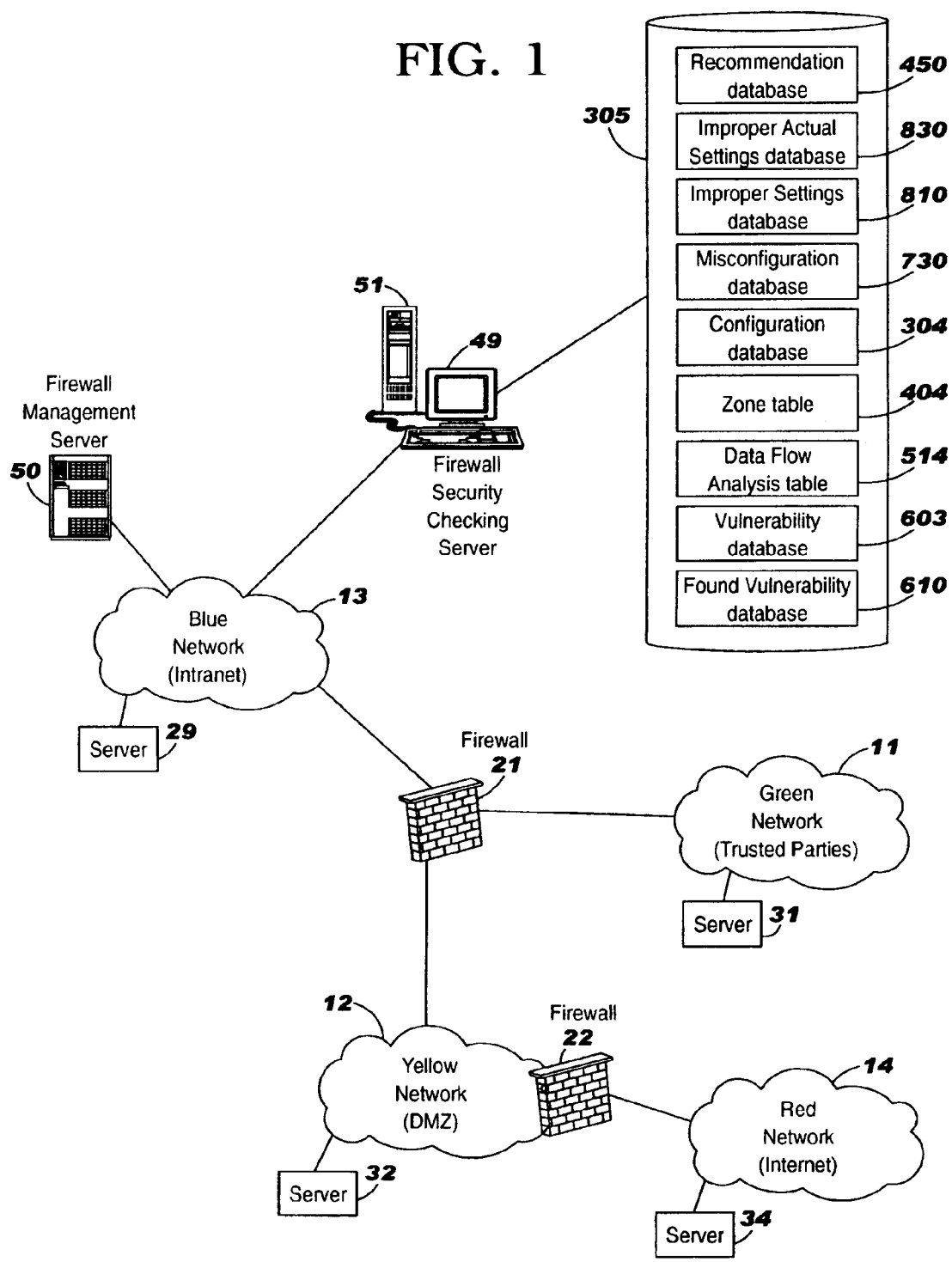
FIG. 1 is a block diagram of multiple, interconnected networks in which the present invention can be used, and includes a firewall security checking server to execute a security checking program according to the present invention.

The present invention will now be described in detail with reference to the figures. FIG. 1 illustrates four networks 11-14. Network 13 has a firewall 21 which filters communications between network 13 and networks 11 and 12. There may be routers (not shown) within networks 11, 12 and 13. By way of example, network 13 is a secure, ("Blue") enterprise intranet, network 12 is a semi-secure ("Yellow") DMZ, and network 11 is semi-trusted ("Green") network (from the point of view of network 13). By way of example, network 14 is an untrusted network such as the Open Internet, and is coupled to DMZ network 12 via another firewall 22 of DMZ network 12. However, the present invention can be used with a wide variety of networks. Network 13 comprises a firewall management computer 50 which manages firewall 21. The management functions include authorization, logging, and remote administration. Network 13 also comprises a firewall security checking server 51 which is responsible for checking the security policy within firewall 21 and reporting any vulnerabilities, misconfigurations and problems in settings. (Alternately, firewall security checking server 51 could exist on a standalone network.) Network 13 also comprises one or more servers 29 and workstations (not shown). Network 11 comprises one or more servers 31 which can communicate with server 29 via firewall 21. Likewise, network 12 comprises one or more servers 32 which can communicate with server 29 via firewall 21. Network 14 comprises one or more servers 34 which can communicate with servers 32 via firewall 22.

Figure 2:
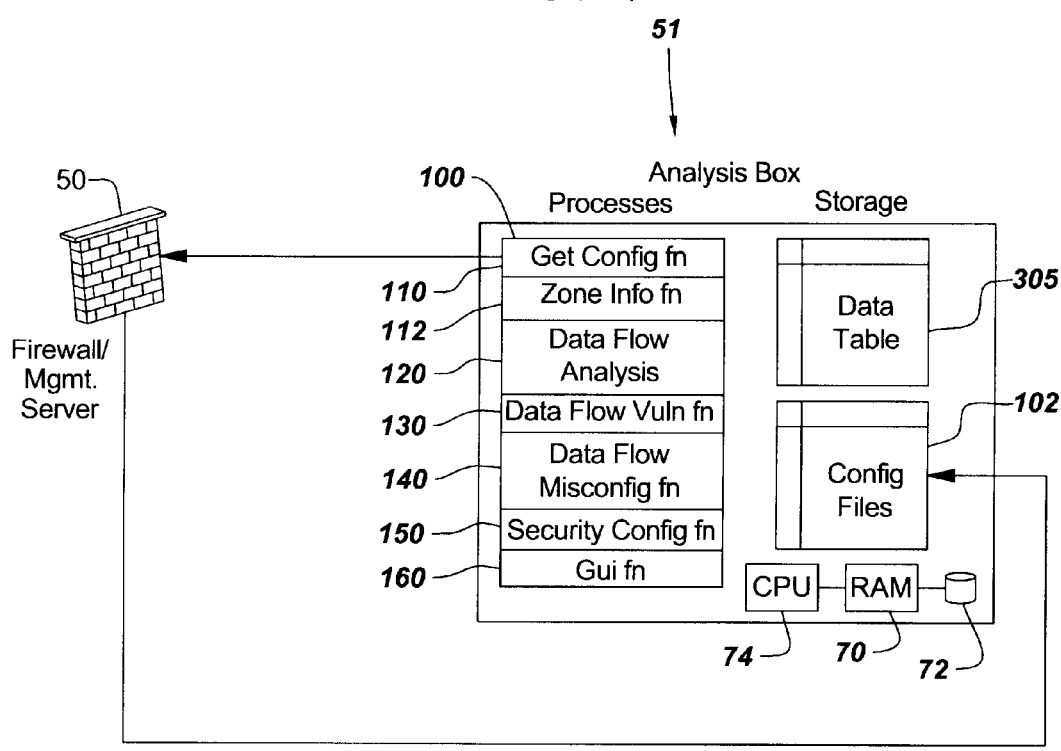
FIG. 2 is a more detailed block diagram of FIG. 1 illustrating the specific program functions within the security checking program.

FIG. 2 illustrates a firewall security checking program 100 within memory 70 and/or storage 72 of firewall security checking server 51 for execution by CPU 74. Security checking program 100 identifies all data flows and highlights vulnerable and misconfigured data flows and improper firewall settings permitted by firewall 21, and then displays them as described below. Security checking program 100 includes the following program functions or modules. A program function 110 gathers configuration information about firewall 21 needed to determine the data flows, vulnerabilities and misconfigurations. A program function 112 gathers firewall interface and zone/network information for each firewall, such as which types of networks connect to firewall 21. The interface and zone information is needed to correlate a set of data flow rules to the proper firewall interface and adjacent zone/network. In the illustrated example, the different types of networks include a "Blue" zone such as the enterprise intranet, a "Green" zone such as a network accessible only to semi-trusted entities such as business partners, a "Yellow" zone such as a DMZ for an intranet, and a "Red" zone such as the Internet. A program function 120 checks data flow rules for each interface, such as what protocols and ports should be permitted to/through the interface. A program function 130 determines vulnerabilities in data flows such as use of vulnerable communication programs, protocols and ports. A program function 140 determines misconfigurations in data flows such as when the firewall permits two contradictory rules. A program function 150 determines errors in settings within the firewall unrelated to data flow rules, such as settings for an SNMP function (for notification and management of events) and administration of the firewall 21. A program function 160 controls a computer display to graphically present the data flows, vulnerabilities and misconfigurations in a manner which effectively shows the data flows, vulnerabilities and misconfigurations to the user.

Figure 3:
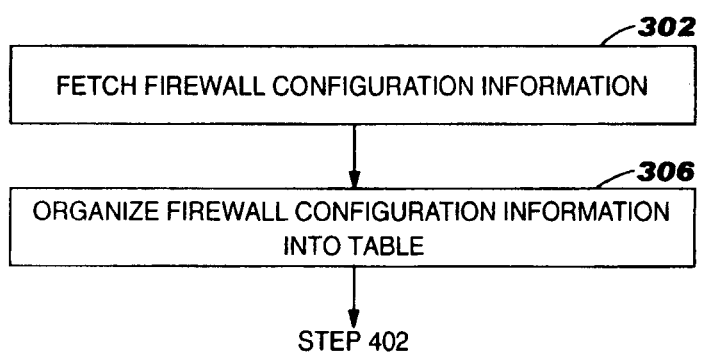
FIG. 3 is a flow chart illustrating the steps of a program function within the security checking program of FIG. 1 to gather information about the data flow configuration of firewall.

As illustrated in FIG. 3, program function 110 requests and gathers configuration information about the firewall 21 needed to determine data flows, vulnerabilities and misconfigurations within firewall 21. The configuration information comprises a set of firewall data flow rules, firewall settings, authentication methods and information about the security level of each zone/network connected to the firewall. For example, a Cisco Pix firewall specifies a security level of an adjacent zone by a number 0-100 where "0" is the lowest security, i.e. the (red) Internet, and "100" is the highest security, i.e. the (blue) intranet. Because the green zone has a higher security representation than the yellow zone, it would accordingly be represented by a higher number. The firewall "rules" specify which data flows are permitted and not permitted (a) into the firewall, (b) out of the firewall and (c) through the firewall, i.e. from one firewall interface to another firewall interface. A "data flow" may be defined by a source IP address, destination IP address, IP protocol and port number of a communication. The firewall "interfaces" indicate a physical connection to a network and therefore define the networks which are serviced by the firewall. Program function 110 obtains the configuration information by request (for example by secure shell or e-mail from an administrator) directly from configuration files within firewall 21, or by request from firewall management console 50 (step 302). After gathering the information, program function 110 stores the configuration information as a configuration table or file 304 in storage 305 (step 306).

Figure 4:
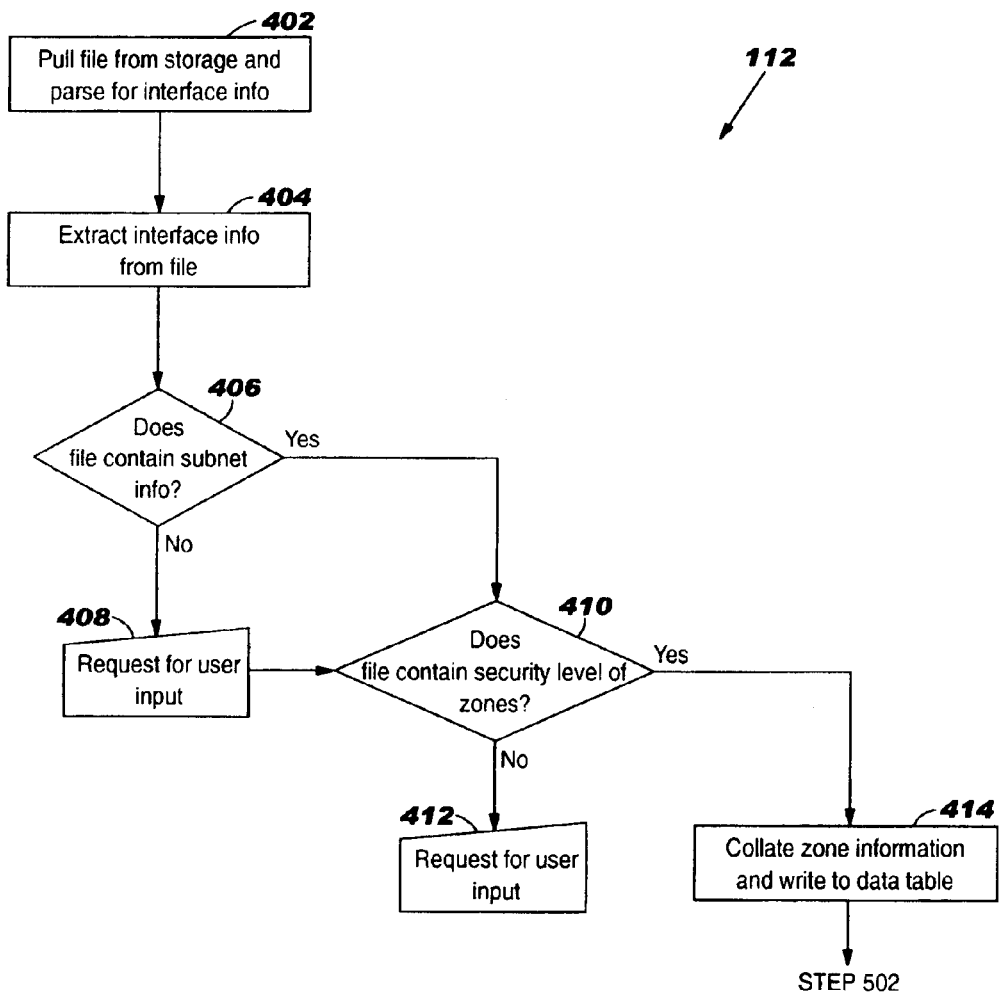
FIG. 4 is a flow chart illustrating the steps of a program function within the security checking program of FIG. 1 to determine information about zones interconnected by the firewall, and the interfaces for each zone.
Figure 5:
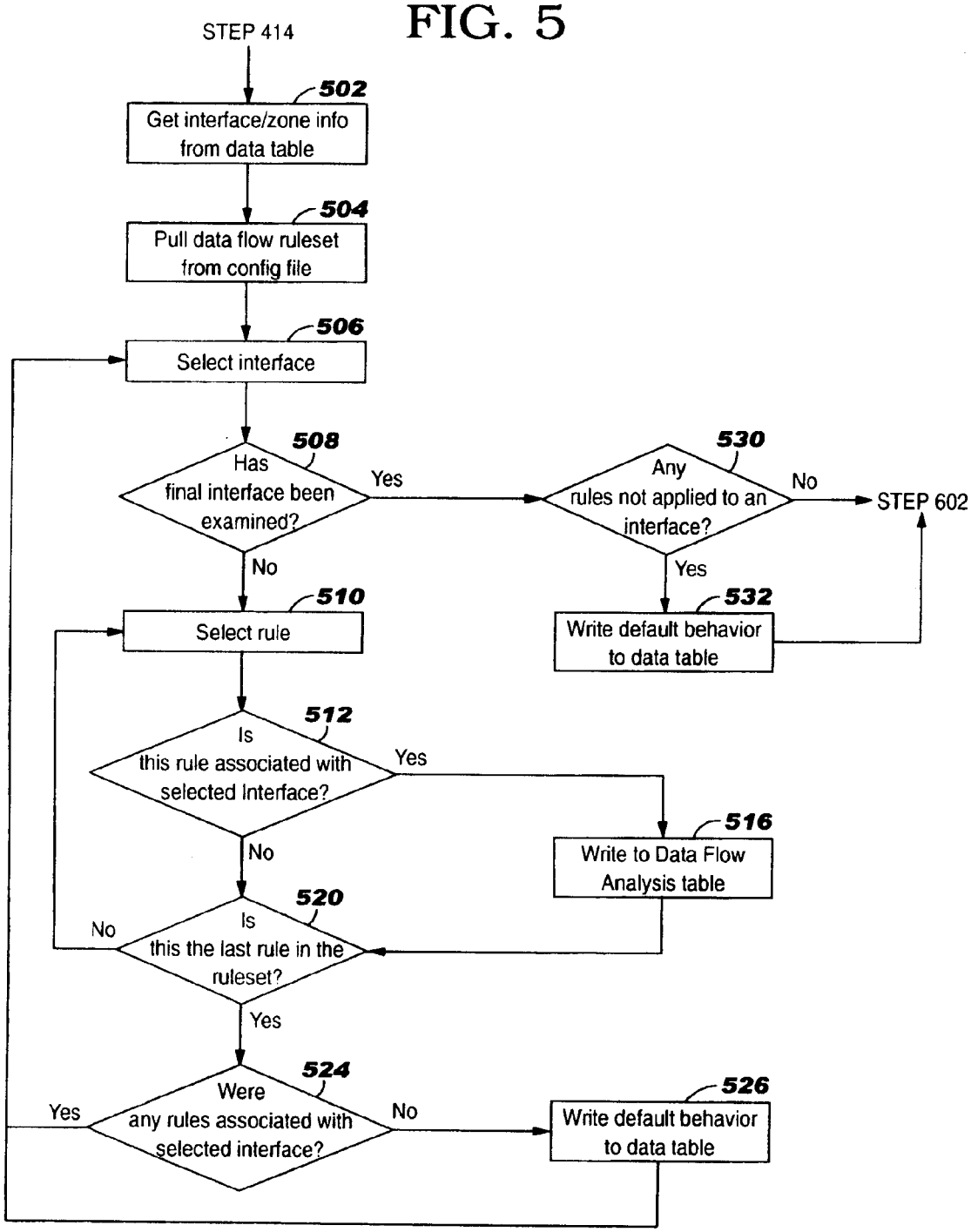
FIG. 5 is a flow chart illustrating the steps of a program function within the security checking program of FIG. 1 to determine data flows through each interface of the firewall.

As illustrated in FIG. 4, program function 112 gathers zone/network information needed to determine data flows, vulnerabilities and misconfigurations within firewall 21. In step 402, program function 112 reads from storage 305, the configuration file 304 generated by program function 110. Then, program function 112 parses the file 304 to identify the firewall 21 interfaces (steps 402 and 404). Then, program function 112 determines if the configuration file 304 contains other network information, such as the range of IP addresses for each network, the IP address of each device in the network, and description of routing to networks not directly connected to firewall 21 (step 406). If configuration file 304 does not contain all of this network information, then program function 112 queries the user to input the missing network information (step 408). If the configuration file 304 contains all of this network information or after the user enters the missing network information, program function 112 determines if the configuration file 304 indicates a numerical security level of each zone (decision 410). If not, then program function 112 queries the user to input the numerical security level of each zone, preferably the numerical value on a scale of one to one hundred; similar to security rankings used by the Cisco PIX firewall (step 412). If the configuration file contains the security level information of each zone, or after the user enters the zone security level information, program function 112 "collates" the zone information, i.e. associates with each firewall interface the security levels of each zone or remote network. Then, program function 112 writes the collated zone information to a zone table 404 in storage 305 (step 414).

As noted above, program function 120 analyses data flow rules for each interface. Program function 120 operates as follows. In step 502, the data flow checking program function 120 reads the firewall interface and zone information from the zone table 404. Program function 120 also reads data flow rules from the configuration file 304. Then, program function 120 selects one of the firewall interfaces to begin a data flow rule checking to correlate to each interface, the rules that apply to the interface (step 506). Assuming there is still an interface yet to be analyzed for firewall 21 (decision 508, no branch), program function 120 reads the first rule (step 510), and determines if it is associated with the interface currently being evaluated (decision 512). This determination is made by evaluating IP addresses or access list names. If the rule is associated with the interface currently being evaluated (decision 512, yes branch), program function 120 writes the rule to a data flow checking table 514 (step 526). However, if the rule is not so associated or after step 516, program function 120 determines if this is the last rule in the ruleset to consider (decision 520). If not (decision 520, no branch), then program function 120 loops back to step 510 to select the next rule in the ruleset and determine whether it is associated with the interface currently being evaluated. Steps 510, 512, 516 and 520 are repeated for each rule in the ruleset. Then, (decision 520, yes branch), program function 120 determines from data flow checking table 514 if any rules from the ruleset were found to be associated with the current interface being evaluated (decision 524). If not, program function 120 writes default behavior to the data flow checking table 514 for this interface (step 526). The default behavior comprises logic of the specific firewall type, for example, how it handles null rulesets. After decision 524, yes branch, where there was at least one rule from the ruleset found to be associated with the current interface or after step 526, program function 120 loops back to step 506 to repeat the foregoing steps 508, 510, 512, 516, 520, 524 and 526 for the next interface of firewall 21.

Refer again to decision 508, yes branch, where program function 120 has evaluated the last interface for firewall 21. At that time, program function 120 determines if any rules in the ruleset have not been found to be associated with an interface of firewall 21 (decision 530). If so, program function 130 writes default behavior to data flow checking table 514 (step 532). The default behavior comprises logic of the specific firewall type, for example, how it handles rules that have not been associated with an interface. However, if program function 120 has found all of the rules of the ruleset to be associated with an interface of firewall 21 (or after step 532), then program function 120 has completed its checking, and proceeds to step 602 to invoke program function 130.

Figure 6:
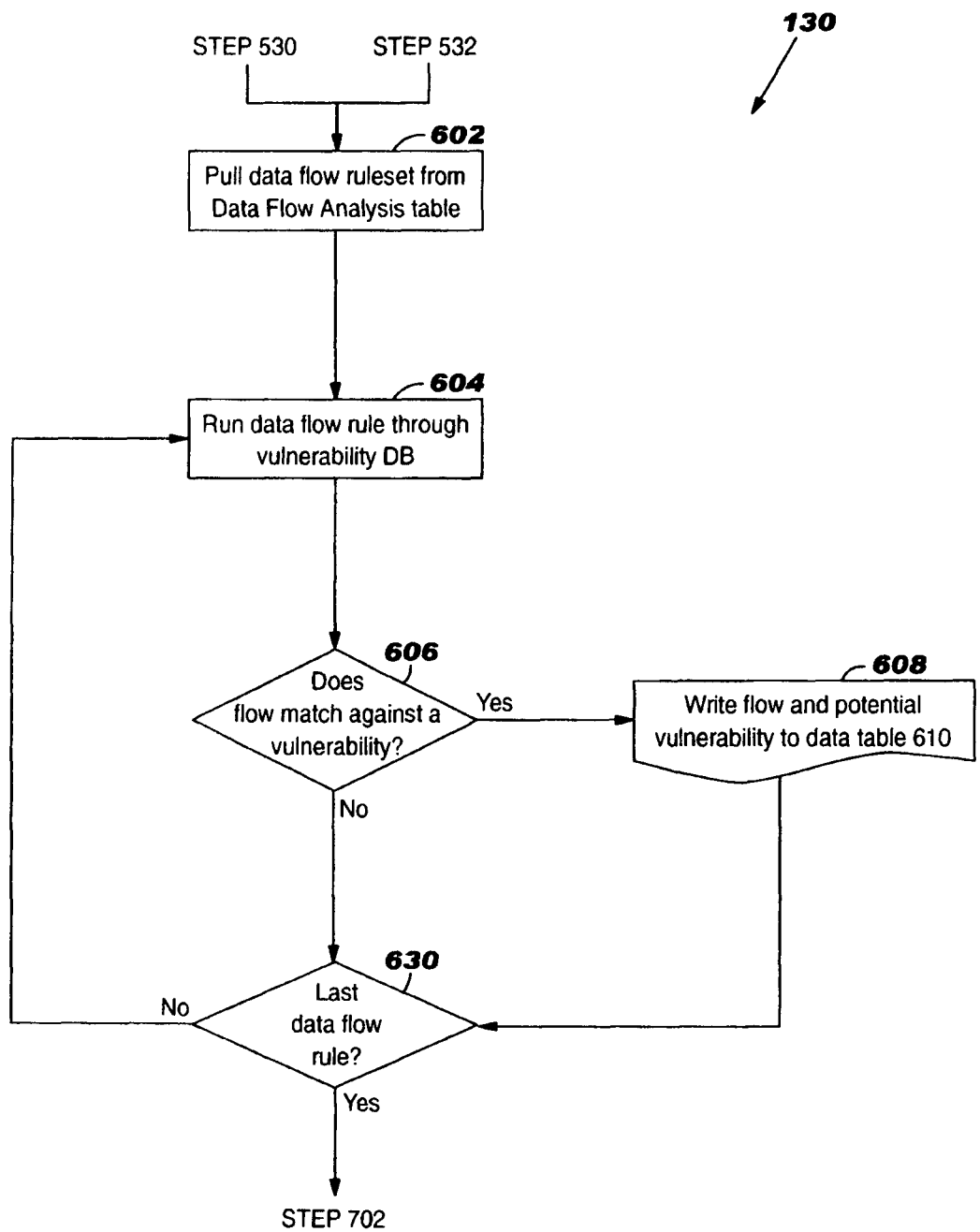
FIG. 6 is a flow chart illustrating the steps of a program function within the security checking program of FIG. 1 to determine vulnerabilities in the data flows through the firewall.

FIG. 6 illustrates program function 130 in detail. As noted above, program function 130 determines data flow vulnerabilities such as use of vulnerable communication programs, protocols and ports for certain firewall interfaces and their respective zones. A vulnerability database 603 in storage 305 is maintained with current information. The vulnerability database 603 lists known data flow vulnerabilities based on type of service, protocol, port number, respective zones, and other factors. Some examples of data flow vulnerabilities are the following:

a communication using FTP because userID and password flow in the clear, i.e. unencrypted, an unauthenticated communication permitted from a lower security zone to a higher security zone, a permitted communication using inherently risky remote access commands, such as RSHELL, RLOGIN, RHOST, a rule allowing more ports than are required by the communication, a communication commonly implemented by a vulnerable software product, a communication using Telnet rather than its more secure equivalent (SSH), a communication permitted into a UDP printer port, a communication permitting inherently risky services, such as netbios, DNS, SMTP, a communication permitting all ICMP types, and a communication permitted from a more secure zone to a less secure zone without control by a ruleset to limit who can initiate such a communication.

In step 602, program function 130 reads the contents of data flow checking table 514 which correlates each rule in the ruleset for firewall 21 to the respective interface of firewall 21. Then, program function 130 compares the first rule in 514 to the list of vulnerabilities in the vulnerability database 603 (step 604). If the first one of the rules matches one or more of the vulnerabilities in the vulnerability database 603 (decision 606, yes branch), then program function 130 writes the combination of interface/zone and rule into a "found-vulnerability" database 610 (step 608). However, if the first rule does not match any of the vulnerabilities in vulnerability data base 603 (decision 606, no branch, or after step 608), program function 130 determines if this is the last rule in data flow checking table 514 to be considered (decision 630). If not, then program function 130 loops back to step 604 to repeat steps 604, 606, 608 and 630 for the next rule. After all the rules in data flow checking table 514 have been compared to the vulnerability database 603 (decision 630, yes branch), then program function 130 proceeds to step 702 to invoke program function 140.

Figure 7:
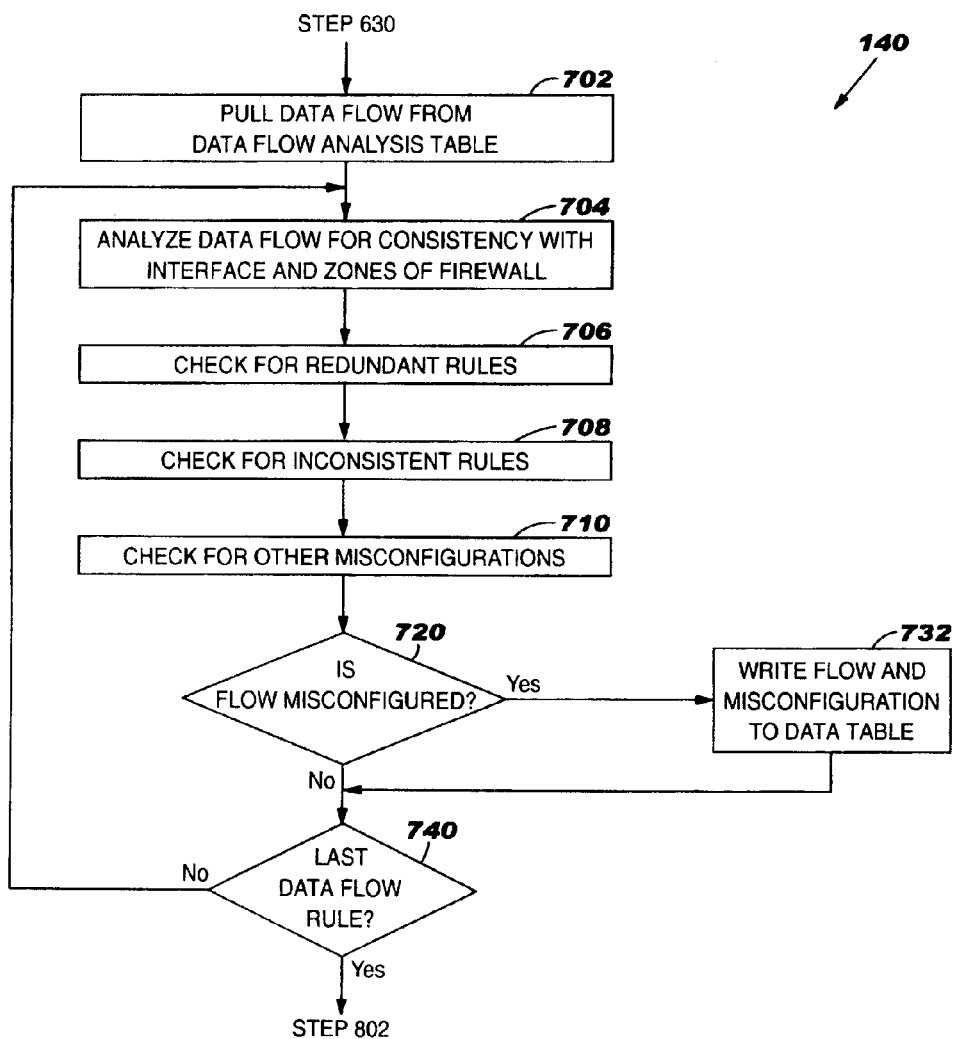
FIG. 7 is a flow chart illustrating the steps of a program function within the security checking program of FIG. 1 to determine misconfigurations in the data flows through the firewall.

FIG. 7 illustrates program function 140 in detail. As explained above, program function 140 determines data flow misconfigurations such as when two or more firewall rules contradict each other, two or more firewall rules are redundant of each other or when a firewall rule specifies a source zone or destination zone that is not consistent with the interfaces of the firewall. In step 702, program function 140 reads the contents of data flow checking table 514 which contains each rule in the ruleset for firewall 21. Next, program function 140 analyses a first data flow rule in 514 for "interface/zone" consistency, i.e. consistency with its interface and respective zones (step 704). For example, if an inbound data flow rule specifies a source IP address, firewall interface and destination IP address, program function 140 checks if the source IP address is in the source zone for the specified interface. Also, for outbound rules, program function 140 checks if the destination IP address is in the destination zone for the specified interface. As another example of processing in step 704, program function 140 checks if the source IP address and destination IP address are in the same network. As another example of processing in step 704, program function 140 checks if there are any data flows terminating at the firewall itself. Next, program function 140 checks the first one of the data flow rules for "rule" redundancy, i.e. redundancy with another data flow rule considered in a previous iteration of program function 140 (step 706). A redundancy exists when two rules permit the same data flow. This check is made by comparing each rule against each other rule. Next, program function 140 checks the first data flow rule for "rule" contradiction, i.e. contradiction with a previous one of the data flow rules considered in a previous iteration of program function 140 (step 708). A contradiction exists where one rule permits a certain data flow and another rule denies this same data flow. This check is made by comparing each rule against each other rule. Next, program function 140 compares the first data flow rule in table 514 for any other type of misconfiguration such as "superset" redundancy where one rule encompasses another rule, making it unnecessary to include this other rule in the rule set (step 710). As another example of processing in step 710, program function 140 checks if the source IP address is not reachable from the source zone of any firewall interface, making it impossible for this rule to apply. As another example of processing in step 710, program function 140 checks if the destination IP address is not reachable through a destination zone for any interface of the firewall, making it impossible for this rule to apply. These other types of potential misconfigurations are listed in the misconfiguration database 703.

For each zone inconsistency, rule redundancy, rule contradiction, or other type of misconfiguration (decision 720, yes branch), program function 140 writes the rule into a misconfiguration table 730 (step 732). If the current rule has no zone inconsistency, rule redundancy, rule contradiction, or other type of misconfiguration or after step 732, program function 140 loops back to step 704 to evaluate the next rule in data flow checking table 514 (decision 740, no branch), i.e. repeats the foregoing steps 704, 706, 708, 710, 720, 732 and 740. After all the rules have been evaluated (decision 740, yes branch), then program function 140 has completed its evaluation, and proceeds to step 802 to invoke program function 150.

Figure 8:
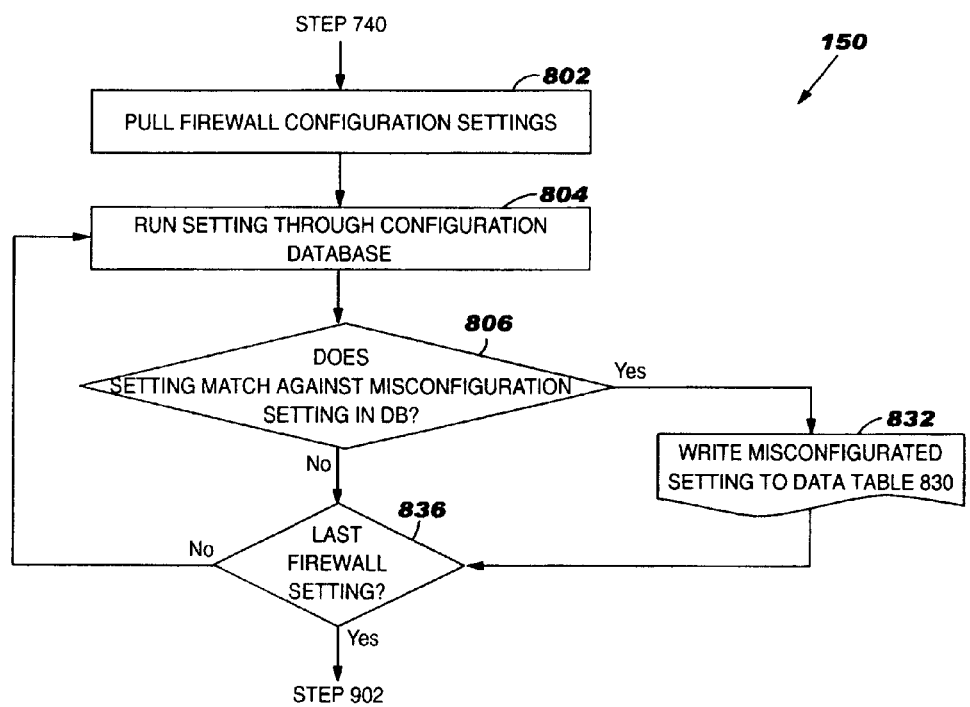
FIG. 8 is a flow chart illustrating the steps of a program function within the security checking program of FIG. 1 to determine improper settings (other than data flows) of firewall.

FIG. 8 illustrates program function 150 in detail. As explained above, program function 150 determines errors in other firewall settings unrelated to data flow rules, such as settings related to an SNMP function (for notification and management of events) and administration of the firewall 21. For example, program function 150 determines usage of improper keys in SNMP, absence of default keys for SNMP, and improper length to SNMP password strings (to access files within the firewall). Program function 150 also determines whether there is proper specification of what information should be logged, whether banners indicating that the network is secure should be displayed, and whether the administrator must authenticate himself or herself to an authentication server before obtaining access to the firewall. Then program function 150 compares this information for the first setting to a list of improper settings maintained in findings database 810 (step 804). These improper settings were previously entered into database 810. If the actual setting matches an improper setting (decision 806, yes branch), then program function 150 writes the improper actual setting into an improper actual setting database 830 (step 832). If the first one of the settings was proper (decision 806 yes branch) or after step 832, if there is another actual setting to evaluate (decision 836, no branch), program function 150 loops back to step 804 to review the next actual setting, as described above. After all the actual settings have been evaluated, program function 150 has completed its evaluation, so it invokes program function 160 at step 902.

Figure 9A:
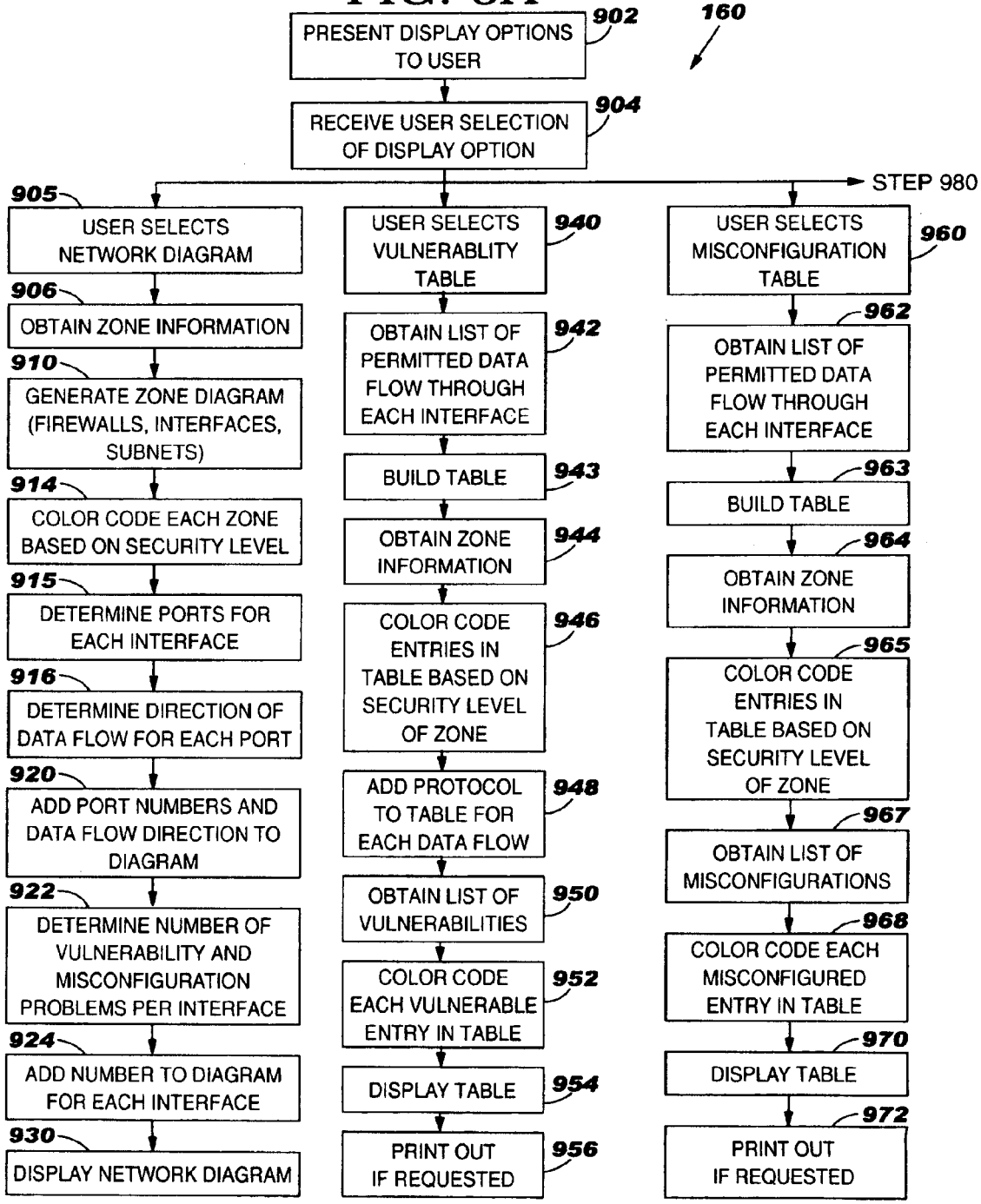

FIGS. 9(A) and 9(B) illustrate program function 160 in detail. As explained above, program function 160 controls a computer display to graphically present the data flows, vulnerabilities and misconfigurations in a manner which effectively shows the vulnerabilities and misconfigurations to the user. In step 902, program function presents to a user four different options for display.

Figure 10:
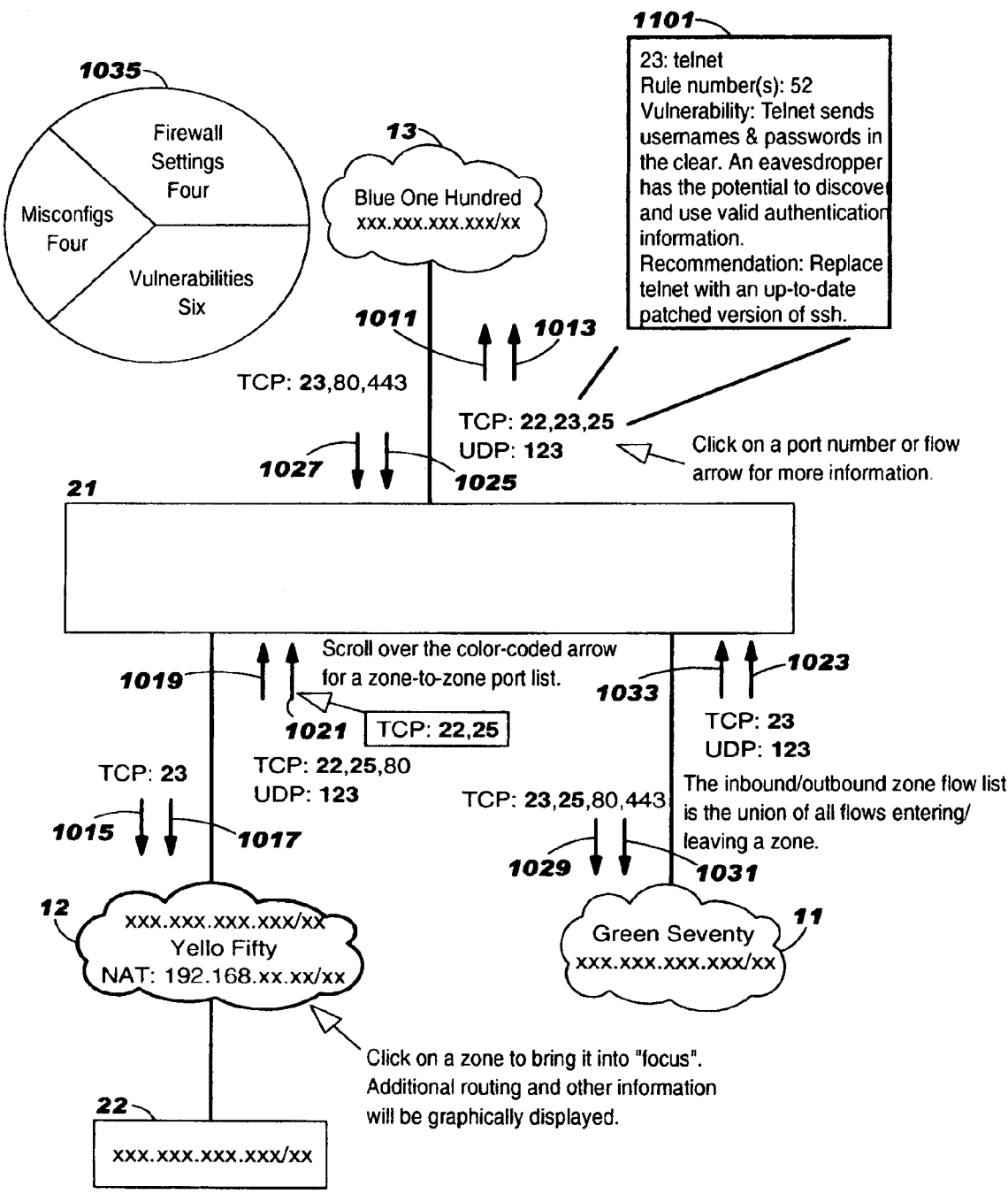
FIG. 10 is an example of a network diagram generated by the program function of FIGS. 9(A) and 9(B).

The first option (leading to branch 905) is to display a network diagram illustrating the various firewalls, interfaces and networks/zones with the type of each network/zone indicated by blue, green, yellow or red coloration or other representative color coding of a network icon. In the illustrated example, each network icon is a "cloud". The network diagram also indicates for each interface, adjacent to the interface, a list of the permitted (or "active") port types, port numbers and by arrow, the direction of the permitted communication through each port. The network diagram also indicates for each firewall, the total number of problematic rules of each type, i.e. data flow vulnerabilities, data flow misconfigurations and improper settings. FIG. 10 illustrates an example of a network diagram corresponding to a portion of the computer system of FIG. 1, from the vantage point of firewall 21, i.e. firewall 21 and the networks 11, 12 and 13 connected to firewall 21.

In the example of FIG. 10, the three networks or "zones" 11, 12, and 13 connected to the firewall 21 are color-coded according to their security levels. (FIG. 10 is shown in black and white pursuant to USPTO rules, although in actuality, the network icons, flow arrows and certain port numbers are colored to provide associated information.) Thus, the network icon for blue network 13 is colored blue, the network icon for yellow network 12 is colored yellow, and the network icon for green network 11 is colored green. Each network icon is labeled with its network, network address translation ("NAT") information (if any), and its numerical security level. In the illustrated example, blue zone network 13 is a secure company intranet, green zone network 11 is a trusted network, red zone network 21 is an untrusted network such as the Internet, and yellow zone network 12 is a DMZ network separating the blue zone network from the untrusted, red zone Internet. As a default, when a user does not supply color information for each type of network, the color coding will correspond to a reverse rainbow, with blue being the most secure network, and red the most insecure (typically the Internet). By way of example, the blue zone network 13 has security level of one hundred, the green zone network 11 has security level of seventy, and the yellow zone network 12 has security level of fifty. The higher the security level, the more secure the network.

FIG. 10 also illustrates a summary pie chart 1035 labeled with the total number of data flow vulnerabilities, data flow misconfigurations, and improper firewall settings for firewall 21. Each section of the pie is labeled with the total number of findings of the corresponding type. If the user selects any of the pie sections, for example, by clicking with a mouse button, the corresponding table (see FIGS. 11-13) will be displayed. For example, if the section labeled "Firewall Settings Four" is clicked, then a firewall settings table would be displayed such as the one illustrated in FIG. 13. In this example, the displayed firewall settings table has four improper firewall setting entries in all.

FIG. 10 also illustrates two sets of port numbers adjacent to each network; one set specifies the inbound ports used by this network to receive a communication from other networks, and the other set specifies the destination ports specified in communications from this network to other networks. These ports are the ports of a network device which receives the communication, for example, a web server, a database server or a mail server. In operation, firewall 21 reviews the port specified in each communication sent to the firewall en route to the destination network, and filters that communication if specified in the associated firewall rule. In the illustrated example, network 13 uses port numbers 22, 23, 25 and 123 to receive communications from other networks, and sends communications to port numbers 23, 80 and 443 of other networks. Network 12 uses port number 23 to receive communications, and sends communications to port numbers 22, 25, 80 and 123 of other networks. Network 11 uses port numbers 23, 25, 80 and 443 to receive communications, and sends communications to port numbers 23 and 123 of other networks. The port numbers on each port list are color-coded according to the severity of the associated vulnerability finding made by program function 130. A black number has no associated vulnerability. A green number is a low vulnerability, a yellow number is medium vulnerability, and a red number is high vulnerability. The same port number may have different vulnerability ratings depending on the direction of flow, host-to-host limitation, or other factors. For example, allowing an ntp communication from any host in one zone to any host in a higher-security zone is typically more dangerous (and therefore rated as a higher vulnerability) than allowing the NTP communication from one designated ntp server in a high-security zone to a few specific other hosts in a lower-security zone. The following is the color code in the illustrated example. Inbound port 22 of network 13 is color coded green to represent a low severity level of vulnerability. Inbound port 123 and destination port 23 of network 13 are color coded yellow to represent an intermediate severity level of vulnerability. Inbound ports 23 and 25 of network 13 are color coded red to represent a high severity level of vulnerability. Destination ports 22 and 123 of network 12 are color coded green to represent a low severity level of vulnerability. Inbound port 23 and destination port 25 of network 12 are color coded red to represent a high severity level of vulnerability. Inbound port 23 and destination port 123 of network 11 are color coded yellow to represent an intermediate severity level of vulnerability. Inbound port 25 and destination port 23 of network 11 are color coded red to represent a high severity level of vulnerability.

FIG. 10 also illustrates by arrows the data flows/communications between zones. For each zone 11, 12 and 13, colored arrows represent flows into and flows out of the zone, for the corresponding sets of ports shown at the source of the arrow. The color of a flow arrow corresponds to the security of the zone which is sending the communication in the case of an inbound communication (the arrows point towards the respective network clouds), and corresponds to the security of the zone which is receiving the communication in the case of an outbound communication (the arrows point towards the firewall). In the illustrated embodiment, the ports listed next to each set of color-coded flow arrows of the same direction include all flows in that direction. Thus, if a communication is flowing to the blue zone 13 from any other zone, the port associated with that communication will be listed in the inbound port list for the blue zone 13 at the source of the incoming flow arrows. For example, if SSH (TCP port 22) is allowed from yellow to blue, then the SSH port number will appear in the list of inbound ports next to the flow arrows for the blue zone 13, even when SSH is not permitted to flow from the green zone to the blue zone. The following are specific examples of the arrows in FIG. 10. A yellow arrow 1011 pointing toward the blue zone network 13 represents all flows originating in the yellow zone network 12 and sent to one or more of ports 22, 23, 25 and 123 of the blue zone network 13.

A green arrow 1013 pointing towards the blue zone network 13 represents all flows originating in the green zone network 11 and sent to one or more of ports 22, 23, 25 and 123 of the blue zone network 13. A green arrow 1027 pointing away from blue zone network 13 represents all flows originating in the blue zone network 13 and sent to one or more of ports 23, 80 and 443 of the green zone network 11. A yellow arrow 1025 pointing away from blue zone network 13 represents all flows originating in the blue zone network 13 and sent to one or more of ports 23, 80 and 443 of the yellow zone network 12. A green arrow 1015 pointing toward the yellow zone network 12 represents all flows originating in the green zone network 11 and sent to port 23 of the yellow zone network 12. A blue arrow 1017 pointing toward the yellow zone network 12 represents all flows originating in the blue zone network 13 and sent to port 23 of the yellow zone network 13. A green arrow 1019 pointing away from the yellow zone network 12 represents all flows originating in the yellow zone network 12 and sent to one or more of ports 22, 25, 80 and 123 of the green zone network 11. A blue arrow 1021 pointing away from the yellow zone network 12 represents all flows originating in the yellow zone network 12 and sent to one or more of ports 22, 25, 80 and 123 of the blue zone network 13. A yellow arrow 1029 pointing toward the green zone network 11 represents all flows originating in the yellow zone network 12 and sent to one or more of ports 23, 25, 80 and 443 of the green zone network 21. A blue arrow 1031 pointing toward the green zone network 11 represents all flows originating in the blue zone network 13 and sent to one or more of ports 23, 25, 80 and 443 of the green zone network 11. A yellow arrow 1033 pointing away from green zone network 11 represents all flows originating in the green zone network 11 and sent to one or more of ports 23 and 123 of the yellow zone network 12. A blue arrow 1023 pointing away from green zone network 11 represents all flows originating in the green zone network 11 and sent to one or more of ports 23 and 123 of the blue zone network 13. (In an alternate embodiment of the present invention, for each arrow into each zone/network there is a separate list of ports, shown at the source of the arrow, used for the communication represented by the arrow.)

To see a list of the ports/services used from one specific zone to another, for example only ports/services flowing from the yellow zone 12 to the blue zone 13, the user can scroll over the respective colored arrow(s), in this example, arrow 1011. As the mouse passes over the arrow, a box will pop up with a list of only the ports/services flowing between the two zones represented by the arrow.

In order to examine the security findings for flows between two zones in more detail, the user may click on a flow arrow. A window, such as pop up window 1101, will pop up with a list of vulnerable ports/services and the vulnerability information corresponding to each flow. The vulnerability information for a flow includes a description of the finding, (such as shown in pop up window 1101), the relevant line number(s) from the configuration file 304, recommendations for the administrator, and other information. To access vulnerability information for one specific port/service, the user may click on a colored port number in any port list. A window will pop up containing the vulnerability information for that flow only. The vulnerability information for a specific port/service includes the same information described above.

Each security zone may have non-dataflow features that can be determined from the loaded configuration file 304. These features may include routing information, the location of logging and other special-purpose servers, etc. The basic network diagram does not display this information. However, if the user wishes to examine these additional features, the user may click on the network icon (cloud) to bring it into "focus." When a network is in "focus", all such additional information is graphically displayed. In the illustrated example, there is another firewall 22 between the yellow zone network 12 and the red zone network 14. If the IP addresses in the red zone 14 are reachable through the yellow zone 12, then there must be routing information for those red addresses in the configuration file 304 of the firewall 21 currently under examination. Therefore, the existence of the firewall 22 can be deduced from the configuration file 304 of the firewall 21. It will appear as a router on the sample network diagram (FIG. 10) when the yellow zone 12 is brought into focus. If different zones are brought into focus, different information will be revealed. If, for example, the blue zone 13 is brought into focus (not shown), the user will see a type of authentication server and its IP address attached to the blue zone 13.

Referring again to FIG. 9(A), the second option (branch 940) is to display a table which lists each of the rules in the ruleset for a specified firewall, and the rules which represent data flow vulnerabilities. FIG. 11 illustrates an example of a vulnerability table for firewall 21. (FIG. 11 is shown in black and white pursuant to USPTO rules, although in actuality, some of the entries as described below are colored to provide associated information.) The Rule Number column identifies the order in which the rules are processed by the firewall. For each of the rules there is an entry for (a) security rating, (b) rule number, (c) source IP address for the data flow, (d) destination IP address for the data flow, (e) IP protocol, (f) port and (g) rule action. For each rule, the entry for the source IP address is color coded indicating the type of source network/zone, for example, blue, green, yellow or red. (If the type of source network for the source IP address is not limited, then the entry for the source IP address is "any" and is not color coded to indicate all networks connected to the firewall.) In the example, the source IP addresses for rules 1, 2, 3, 10, 11 and 13 are color coded blue, the source IP addresses for rules 5, 9 and 12 are color coded yellow, and the source IP addresses for rules 6 and 14 are color coded green. Likewise, for each rule, the entry for the destination IP address is color coded indicating the type of destination network/zone, for example, blue, green, yellow or red. In the example, the destination IP addresses for rules 1,2,3, 9 and 12 are color coded blue, and the destination IP addresses for rules 4, 6, 7, 8, 10, 11, 13 and 14 are color coded yellow. For any of the rules for which program functions 130 has identified a vulnerability problem, the rule number is highlighted to indicate a hyperlink, the security rating entry is listed as high, medium or low and color coded red, yellow or green, respectively, to indicate the severity of the problem. In the example, rule numbers 4, 5, 9 and 12 are color coded blue, and have color coded security rating entries. The Protocol column refers to protocols within the IP suite. The most common IP suite protocols used are TCP, UDP and ICMP. The Rule Action column identifies if the communication flow is being allowed or denied.

Rules that have a vulnerability have a hyperlink that when clicked pops up a window that provides an explanation of the vulnerability. If the user selects any of these rule entries, for example, by clicking with a mouse button, program tool 160 displays additional information about the rule and a recommendation on how to fix a vulnerability problem, if any, associated with the rule. In the example of FIG. 11, the user has clicked on "Rule 5", and in response, pop up window 1041 is displayed. The additional information comprises a description of vulnerability and mitigation recommendations. Examples of recommendations are as follows: remove rule, rewrite rule, upgrade patch level, use alternate protocol(s). The additional information about each type of problem and the recommendation of how to fix each type of problem were previously entered into a recommendations database 950.

Referring again to FIG. 9(A), the third option (branch 160) is to display a table which lists each of the rules in the ruleset for the firewall, and also indicates the rules which represent data flow misconfigurations. FIG. 12 illustrates an example of a misconfiguration table for firewall 21. (FIG. 11 is shown in black and white pursuant to USPTO rules, although in actuality, some of the entries as described below are colored to provide associated information.) The Rule Number column identifies the order in which the rules are processed by the firewall. For each of the rules there is an entry for (a) security rating, (b) rule number, (c) source IP address for the data flow, (d) destination IP address for the data flow, (e) IP protocol, (f) port and (g) rule action. The table displays the complete ruleset and identifies all rules that have been found to have rule inconsistencies, contradictions and redundancies. The Security Rating column gives a rating of each configuration issue identified. These ratings are based on what effect the rule has on the network. For any of the rules for which program function 140 has identified a data flow configuration problem, there is an "low", "medium" or "high" entry for the security rating, and color coding of the security rating entry indicating the severity of the configuration problem, for example, green, yellow or red, respectively. The lower the security rating, the lesser the effect on the network caused by the misconfiguration. For any of the rules for which program function 140 has identified a data flow configuration problem, there is also highlighting of the respective rule number to indicate a hyperlink. In the example, rules 3, 7, 8, 10, 13 and 14 have been highlighted. Rules that have a misconfiguration have a hyperlink that when clicked pops up a window that provides an explanation of the misconfiguration. If the user selects any of these rule entries, for example, by clicking with a mouse button, program tool 160 displays additional information about the rule and a recommendation on how to fix the problem. In the example, the user has clicked rule 8, and in response, a pop up window 1051 has been displayed. The additional information comprises a description of the vulnerability and mitigation recommendations. Examples of recommendations are as follows: remove rule, rewrite rule, upgrade patch level, use alternate protocol(s). The additional information about each type of problem and the recommendation of how to fix each type of problem were previously entered into the recommendations database 950. The entries in the Source IP address(es) column and Destination IP Address(es) columns are color-coded based upon the type of their zone. The color red identifies an Internet (unknown and untrusted) network. The color yellow identifies an extranet (known but untrusted, i.e. semi-secure) network. The color green identifies a protected extranet (known and semi-trusted) network. The color blue identifies an intranet (known and trusted) network. In the example, the entries for the source IP addresses for rules 1, 2, 3, 8, 10, 11 and 13 are color coded blue, the entries for the source IP addresses 5, 7, 9 and 12 are color coded yellow, and the source IP addresses for the entries for rules 6 and 14 are color coded green. In the example, the entries for the destination IP addresses for rules 1, 2, 3, 9 and 12 are color coded blue, and the entries for the destination IP addresses 4, 6, 7, 8, 10, 11, 13 and 14 are color coded yellow. Thus, in this example, rules 7, 8, 10, 13, and 14 create inconsistencies, contradictions and redundancies between rules. However, because the rules create minimal effect, if one rule denies a host access, but a later rule allows the same host access, this would be considered a low security rating. Likewise, redundant rules would be considered a low severity level. In this example, rule 3 is considered a medium risk because it allows access to the firewall on TCP port 49. Firewall rules should never allow flows to the firewall with the exception of management communications. The Protocol column refers to protocols within the IP suite. The most common IP suite protocols used are TCP, UDP and ICMP. The Rule Action column identifies if the communication flow is being allowed or denied.

Figure 13:
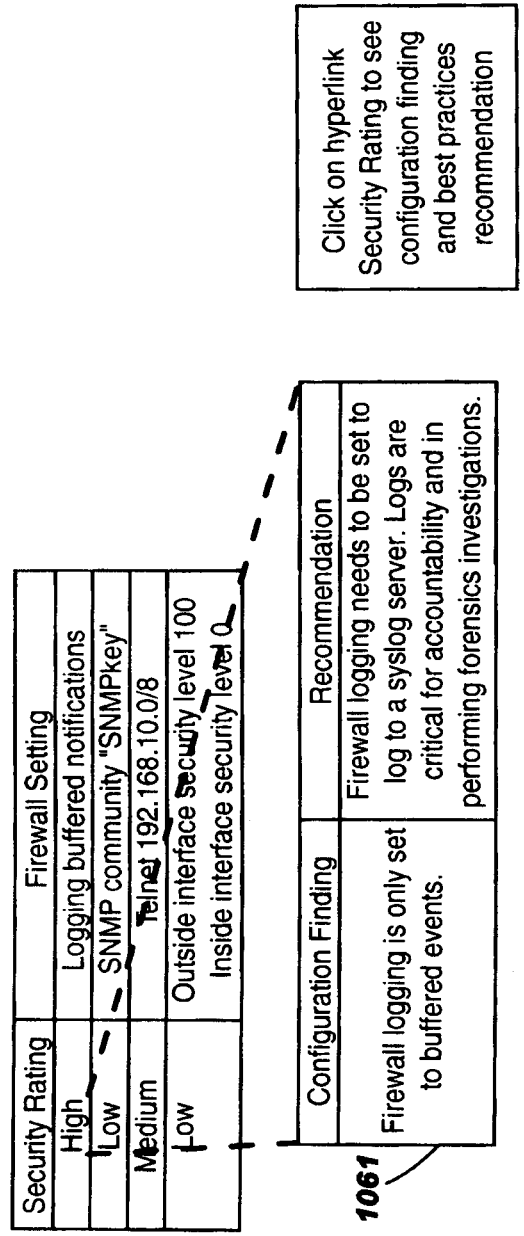
FIG. 13 is an example of an improper settings table generated and displayed by the program function of FIGS. 9(A) and 9(B).

Referring again to FIG. 9(B), the fourth option (branch 980) is to display a table which lists each of the (nondataflow) settings for the firewall. FIG. 13 illustrates an example of a firewall settings table for firewall 21. The firewall settings table identifies the security rating of each firewall setting and whether the firewall setting is improper. The Security Rating column gives a rating of each setting which is identified. There are three types of security ratings, Low, Medium, and High. For any of the settings for which program functions 140 has identified as improper, there is a "high", "medium" or "low" entry for the security rating, and color coding of the security rating entry indicating the severity of the problem, for example, red, yellow or green, respectively. These ratings are based on impact of and difficulty to exploit the setting. A typical low rating, color-coded in green, would have minimal impact on the firewall. In FIG. 13, the example firewall setting, "Outside interface security level 100, Inside interface security level 0," is actually improper but has a low rating, assuming the rules associated with each interface are correct. This is because the rules govern the access through the interface. A typical medium setting, color-coded in yellow, would have moderate impact on the firewall. In FIG. 13, the example firewall setting, "SNMP community "SNMPkey," is considered a medium setting because it would allow an attacker to easily guess the community string and gain SNMP access to the firewall. A typical high setting, color-coded in red, would have substantial impact on the firewall. In FIG. 13, the example firewall setting, "Logging buffered notifications," is considered a high setting because the firewall logs are buffered on the firewall. When the buffer fills up, the buffer starts to write over older logs. Such overflow prevents a good history of events and an accurate record in case a computer forensics investigation is required.

Each rating has a hyperlink that when clicked pops up a window that provides an explanation of the configuration setting and recommendations. If the user selects any of the settings entries, for example, by clicking with a mouse button, program tool 160 displays additional information about the setting and a recommendation on how to fix the problem. In the example, the user has selected the upper entry, and in response, a pop up window 1061 has been displayed. The additional information comprises a description of the vulnerability and mitigation recommendations. Examples of recommendations are as follows: reconfigure SNMP to use private strings, use the authentication to access firewall management, and turn off unnecessary services. The additional information about each type of problem and the recommendation of how to fix each type of problem were previously entered into database 950. After presenting the options to the user in step 902, the user selects one of the options in step 904.

Referring again to FIG. 9(A), if the user selects the option to display the network diagram (branch 905), program function 160 reads the zone table 404 to determine which firewall(s) and their interfaces interconnect which networks/zones (step 906). Program function 160 has in storage, (a) a predetermined "cloud" icon to represent each network/zone, (b) a predetermined firewall icon to represent each firewall in the composite network, and (c) a predetermined connector line to connect each firewall to the networks/zones which it interconnects. From the zone table information and using the predefined icons and a graphical knowledge base to layout the cloud icons so they do not overlap one another and are adjacent to their respective interfaces, program function 160 generates the portion of the network diagram illustrating the interfaces and their respective networks/zones (step 910). Also from the zone table 404, program function 160 learns the security level of each zone, and then color codes the zone icon accordingly, i.e. blue, green, yellow or red (step 914). Next, program function 160 reads the data flow checking table 514 to determine the ports used for communication through each firewall to and from the respective networks/zones (step 915), and the direction of each data flow (step 916). Program function 160 uses this information to list the port numbers adjacent to the displayed firewall icons and generate arrows indicating the direction of the permitted communication through the ports (step 920). Next, program function 160 reads the data flow misconfiguration database 730 and found vulnerability database 610 and improper actual setting database 830 to determine the total number of findings (step 922). Then, program function 160 displays these numbers adjacent to the respective firewall (step 924) in the form of pie chart 1035. Finally, program function 160 displays the resulting network diagram on display screen 49 to the user (step 930).

Refer again to step 904 where the user selects a display option. If the user selects the option to display the data flow vulnerability table (branch 940), program function 160 reads the data flow checking table 514 to determine the data flows permitted through each interface (step 942). For each permitted data flow, the data flow checking table 514 indicates the source IP address, destination IP address, firewall interface, protocol, port, rule action and direction of data flow through the interface. Then, program function 160 begins to build the vulnerability table containing, for each data flow, the rule number, source IP address, destination IP address, and rule action (step 943). Then, program function 160 reads the zone table 404 to determine the security level of each of the networks/zones containing the source IP addresses and each of the networks/zones containing the destination IP addresses (step 944). Then, program function 160 color codes the source IP address entries and destination IP address entries accordingly, i.e. blue, green, yellow and red (step 946). Then, program function 160 reads from the configuration table the type of protocol and port number used for each of the data flows and adds the protocol and port number to the vulnerability table (step 948). Then, program function 160 reads the found-vulnerability database 610 to determine which of the rules pose a vulnerability (step 950). Then, program function 160 assigns to each vulnerable rule a severity level based on a severity table, and color codes the protocol entry according to the severity level, i.e. red, yellow or green (step 952). Finally, program function 160 displays the vulnerability table on display screen 49 (step 954). If requested, program function 160 will also printout the information in the vulnerability table (step 956).

Refer again to step 904 where the user selects a display option. If the user selects the option to display the misconfiguration table (branch 960), program function 160 reads the data flow checking 514 to determine the data flows permitted through each interface (step 962). For each permitted data flow, the data flow checking table 514 indicates the source IP address, destination IP address, firewall interface, protocol, port, rule action and direction of data flow through the interface. Then, program function 160 begins to build the misconfiguration table containing, for each data flow, the rule number, source IP address, destination IP address, protocol, port and rule action (step 963). Then, program function 160 reads the zone table 404 to determine the security level of each of the networks/zones containing the source IP addresses and each of the networks/zones containing the destination IP addresses (step 964). Then, program function 160 color codes the source IP address entries and destination IP address entries accordingly, i.e. blue, green, yellow and red (step 965). Then, program function 160 reads the misconfiguration database 730 to determine which of the rules represent a misconfiguration (step 967). Then, program function 160 assigns a severity level to each misconfiguration based on a severity table, and color codes the protocol entry according to the severity level, i.e. red, yellow or green (step 968). Finally, program function 160 displays the misconfiguration table on display screen 49 (step 970). If requested, program function 160 will also printout the information in the misconfiguration table (step 972).

Refer again to step 904 where the user selects a display option. If the user selects the option to display the firewall settings (branch 980), program function 160 reads the actual improper settings database 830 to determine the actual improper settings within the firewall (step 982). For each improper setting, program function 160 begins to build an improper settings table indicating a description of the actual improper setting (step 984). Then, program function 160 reads the improper settings database 810 to determine a severity level of each improper actual setting (step 986). Then, program function 160 color codes the entry in the improper settings table according to the severity level, i.e. red, yellow or green (step 988). Finally, program function 160 displays the improper settings table on display screen 49 (step 990). If requested, program function 160 will also printout the information in the improper settings table (step 992).

The form of each of the tables which is printed out in steps 956, 972 or 992 may differ from that which is displayed. If the printout is requested, program function 160 converts the reference table used for the display into the printout form, prints it out and displays the printout as well. FIG. 14 illustrates an example of a printout of vulnerability findings for firewall 21, and includes for each vulnerable flow, the security rating for the vulnerability, the number of the rule that causes the vulnerability, the source IP address and destination IP address of the vulnerable flow, the network port and protocol of the vulnerable flow, and the recommendation to mitigate the vulnerability. FIG. 15 illustrates an example of a printout of misconfiguration findings for firewall 21, and includes for each misconfigured rule, the security rating for the misconfiguration, the number of the rule that causes the misconfiguration, the source IP address and destination IP address of the misconfigured flow, the network port and protocol of the misconfigured flow, whether the flow is permitted, and a description of the misconfiguration including where appropriate a recommendation to mitigate the misconfiguration. FIG. 16 illustrates an example of a printout of improper settings of firewall 21, and includes for each improper setting, the security rating for the improper setting, a description of the setting, an explanation of the problem caused by the setting, and a recommendation to correct the setting.

Based on the foregoing, a system, method and program for identifying and displaying data flows, vulnerabilities, misconfigurations and improper settings have been disclosed. However, numerous modifications and substitutions can be made without deviating from the scope of the present invention. For example, the foregoing process of FIGS. 3-9(A) and 9(B) can be repeated for firewall 22. Also, the foregoing process can be repeated for routers or other stateless and/or stateful inspection devices. Also, the foregoing process can be repeated for a set of firewalls to represent holistically, the enterprise wide firewall data flow and vulnerability status. Therefore, the present invention has been disclosed by way of illustration and not limitation, and reference should be made to the following claims to determine the scope of the present invention.

The invention claimed is:

1. A computer program product for reporting permitted message flows through a firewall, the computer program product comprising:
one or more computer-readable non-transitory storage devices and program instructions stored on the one or more storage devices, the program instructions comprising:
program instructions to generate and display a firewall icon representing the firewall and a network icon, the network icon representing a first network;
program instructions to generate and display a first arrow in a first color pointing from the displayed firewall icon to the displayed network icon to indicate that a first communication is permitted to the first network, the first arrow displayed in the first color to represent a security level of a second network from which the first communication originates and to which the firewall is coupled;
program instructions, responsive to a user selection of the displayed first arrow, to determine and display a list of ports from the second network that are permitted by the firewall to originate messages to the first network and a list of ports of the first network that are permitted by the firewall to receive the messages from the second network;
program instructions to generate and display a second arrow in a second, different color having a substantially triangular tip visually pointing from the displayed firewall icon to the displayed network icon to indicate that a second communication is permitted to the first network, the second arrow displayed in the second, different color to represent a security level of a third network from which the second communication originates and to which the firewall is coupled; and
program instructions, responsive to a user selection of the displayed second arrow, to determine and display a list of ports from the third network that are permitted by the firewall to originate messages to the first network and a list of ports of the first network that are permitted by the firewall to receive the messages from the third network; and
wherein the second network has a different security level than the third network as indicated by the first and second arrows being respectively displayed in the first and second, different colors.

2. The computer program product of claim 1, further comprising:
program instructions, stored on at least one of the one or more storage devices, to generate and display between the firewall icon and the network icon identifications of inbound ports of the first network permitted by the firewall to receive messages from the second and third networks.

3. The computer program product of claim 1, further comprising:
program instructions, stored on at least one of the one or more storage devices, to determine and display on or adjacent to the firewall icon a count of vulnerability problems with the firewall, a count of misconfiguration problems with the firewall, or a combination thereof.

4. A computer system for reporting permitted message flows through a firewall, the computer system comprising:
- one or more processors, one or more computer-readable memories, one or more computer-readable non-transitory storage devices, and program instructions stored on the one or more storage devices for execution by the one or more processors via the one or more memories, the program instructions comprising:
- program instructions to generate and display a firewall icon representing the firewall and a network icon, the network icon representing a first network;
- program instructions to generate and display a first arrow in a first color pointing from the displayed firewall icon to the displayed network icon to indicate that a first communication is permitted to the first network, the first arrow displayed in the first color to represent a security level of a second network from which the first communication originates and to which the firewall is coupled;
- program instructions, responsive to a user selection of the displayed first arrow, to determine and display a list of ports from the second network that are permitted by the firewall to originate messages to the first network and a list of ports of the first network that are permitted by the firewall to receive the messages from the second network;
- program instructions to generate and display a second arrow in a second, different color having a substantially triangular tip visually pointing from the displayed firewall icon to the displayed network icon to indicate that a second communication is permitted to the first network, the second arrow displayed in the second, different color to represent a security level of a third network from which the second communication originates and to which the firewall is coupled; and
- program instructions, responsive to a user selection of the displayed second arrow, to determine and display a list of ports from the third network that are permitted by the firewall to originate messages to the first network and a list of ports of the first network that are permitted by the firewall to receive the messages from the third network; and
- wherein the second network has a different security level than the third network as indicated by the first and second arrows being respectively displayed in the first and second, different colors.

5. The computer system of claim 4, further comprising:
- program instructions, stored on the one or more storage devices for execution by the one or more processors via the one or more memories, to generate and display between the firewall icon and the network icon identifications of inbound ports of the first network permitted by the firewall to receive messages from the second and third networks.

6. The computer system of claim 4, further comprising:
- program instructions, stored on the one or more storage devices for execution by the one or more processors via the one or more memories, to determine and display on or adjacent to the firewall icon a count of vulnerability problems with the firewall, a count of misconfiguration problems with the firewall, or a combination thereof.

7. The computer program product of claim 1, wherein the network icon representing the first network is a first network icon, and wherein the computer program product further comprises:
- program instructions, stored on the one or more storage devices, to display a second network icon representing the second network and to display the second network icon coupled to the firewall icon; and
- program instructions, stored on the one or more storage devices, to display a third network icon representing the third network and to display the third network icon coupled to the firewall icon.

8. The computer program product of claim 7, wherein (i) the program instructions to display the firewall icon and the first network icon coupled to the firewall icon, (ii) the program instructions to display the first arrow pointing to the first network icon, (iii) the program instructions to display the second arrow pointing to the first network icon, (iv) the program instructions to display the second network icon coupled to the firewall icon, and (v) the program instructions to display the third network icon coupled to the firewall icon are configured to simultaneously display the firewall icon, the first network icon coupled to the firewall icon, the first arrow pointing to the first network icon, the second arrow pointing to the first network icon, the second network icon coupled to the firewall icon, and the third network icon coupled to the firewall icon.

9. The computer program product of claim 7, further comprising:
- program instructions, stored on the one or more storage devices, to deduce, from a configuration file of the firewall represented by the firewall icon, an existence of another firewall that permits or blocks data flow between the third network and a fourth network; and
- program instructions, stored on the one or more storage devices, to display an icon of the other firewall, responsive to a user selection of the displayed third network icon while the first network icon, the second network icon, the third network icon, and the firewall icon are being simultaneously displayed and while the icon of the other firewall is not being displayed.

10. The computer system of claim 4, wherein the network icon representing the first network is a first network icon, and wherein the computer system further comprises:
- program instructions, stored on the one or more storage devices for execution by the one or more processors via the one or more memories, to display a second network icon representing the second network and to display the second network icon coupled to the firewall icon; and
- program instructions, stored on the one or more storage devices for execution by the one or more processors via the one or more memories, to display a third network icon representing the third network and to display the third network icon coupled to the firewall icon.

11. The computer system of claim 10, wherein (i) the program instructions to display the firewall icon and the first network icon coupled to the firewall icon, (ii) the program instructions to display the first arrow pointing to the first network icon, (iii) the program instructions to display the second arrow pointing to the first network icon, (iv) the program instructions to display the second network icon coupled to the firewall icon, and (v) the program instructions to display the third network icon coupled to the firewall icon are configured to simultaneously display the firewall icon, the first network icon coupled to the firewall icon, the first arrow pointing to the first network icon, the second arrow pointing to the first network icon, the second network icon coupled to the firewall icon, and the third network icon coupled to the firewall icon.

12. The computer system of claim 10, further comprising:
- program instructions, stored on the one or more storage devices for execution by the one or more processors via the one or more memories, to deduce, from a configuration file of the firewall represented by the firewall icon, an existence of another firewall that permits or blocks data flow between the third network and a fourth network; and program instructions, stored on the one or more storage devices for execution by the one or more processors via the one or more memories, to display an icon of the other firewall, responsive to a user selection of the displayed third network icon while the first network icon, the second network icon, the third network icon, and the firewall icon are being simultaneously displayed and while the icon of the other firewall is not being displayed.

\* \* \* \* \*